United States Patent
Kripac

(10) Patent No.: US 7,755,621 B2
(45) Date of Patent: Jul. 13, 2010

(54) FAST INTERACTIVE OBJECT MANIPULATION

(75) Inventor: Jiri Kripac, Fairfax, CA (US)

(73) Assignee: Autodesk, Inc., San Rafael, CA (US)

( * ) Notice: Subject to any disclaimer, the term of this patent is extended or adjusted under 35 U.S.C. 154(b) by 117 days.

(21) Appl. No.: 11/468,151

(22) Filed: Aug. 29, 2006

(65) Prior Publication Data

US 2007/0291028 A1 Dec. 20, 2007

Related U.S. Application Data

(60) Provisional application No. 60/814,593, filed on Jun. 16, 2006.

(51) Int. Cl.
*G06T 17/10* (2006.01)
*G06T 17/40* (2006.01)

(52) U.S. Cl. ............... 345/420; 345/653; 345/664; 345/679

(58) Field of Classification Search ............ 345/420, 345/619, 653, 664, 679
See application file for complete search history.

(56) References Cited

U.S. PATENT DOCUMENTS

| 5,561,747 A | 10/1996 | Crocker et al. |
| 5,760,786 A * | 6/1998 | Marks et al. ............... 345/441 |
| 5,844,563 A | 12/1998 | Harada et al. |
| 6,075,539 A | 6/2000 | Ishida et al. |
| 6,392,645 B1 * | 5/2002 | Han et al. ................... 345/420 |
| 6,629,065 B1 * | 9/2003 | Gadh et al. ..................... 703/1 |
| 6,867,782 B2 * | 3/2005 | Gaudette et al. ............ 345/530 |

OTHER PUBLICATIONS

Robert B. Tilove, "A Null-Object Detection Algorithm for Constructive Solid Geometry," Jul. 1984, Communications of the ACM, vol. 27, No. 7, pp. 684-694.*
Bruce F. Naylor, "Interactive Solid Geometry Via Partitioning Trees," Sep. 1992, Proceedings of the Conference on Graphics Interface '92, pp. 11-18.*
Andrea Sanna, Paolo Montuschi, "An Efficient Algorithm for Ray Casting of CSG Animation Frames," Jan. 14, 1999, The Journal of Visualization and Computer Animation, vol. 9, No. 4, pp. 229-242.*
International Search Report for PCT Application No. PCT/US2007/71025, Apr. 8, 2008.

* cited by examiner

*Primary Examiner*—Jason M Repko
(74) *Attorney, Agent, or Firm*—Fish & Richardson P.C.

(57) ABSTRACT

Methods, systems, and program products for detecting user manipulation of one or more elements of a presentation of a complex solid represented by a solid history tree. A reduced history representation of the complex solid is created. The reduced history tree is repeatedly evaluated to recreate the presentation of the complex solid in response to the user manipulation of the one or more elements.

21 Claims, 6 Drawing Sheets

Union: a + b

Intersection: a * b

Subtraction: a − b

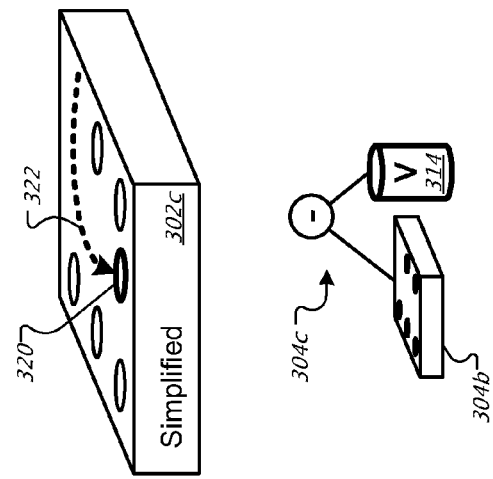
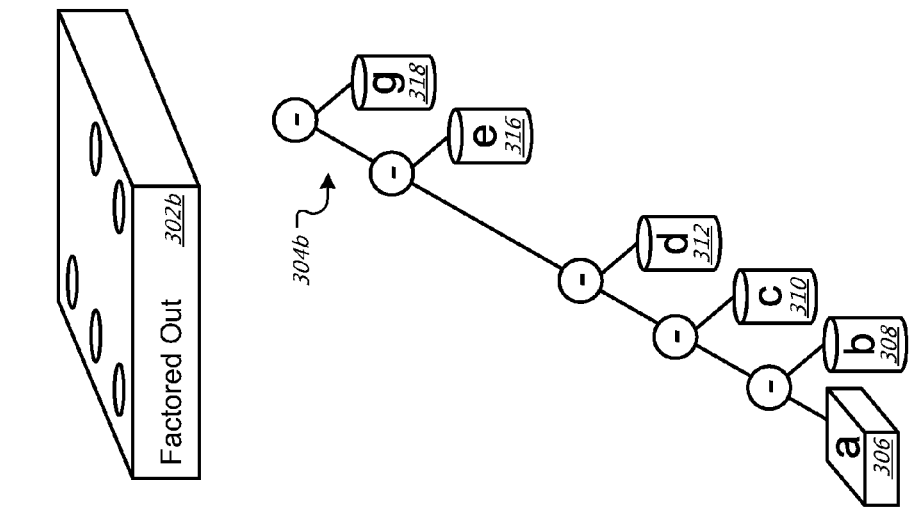
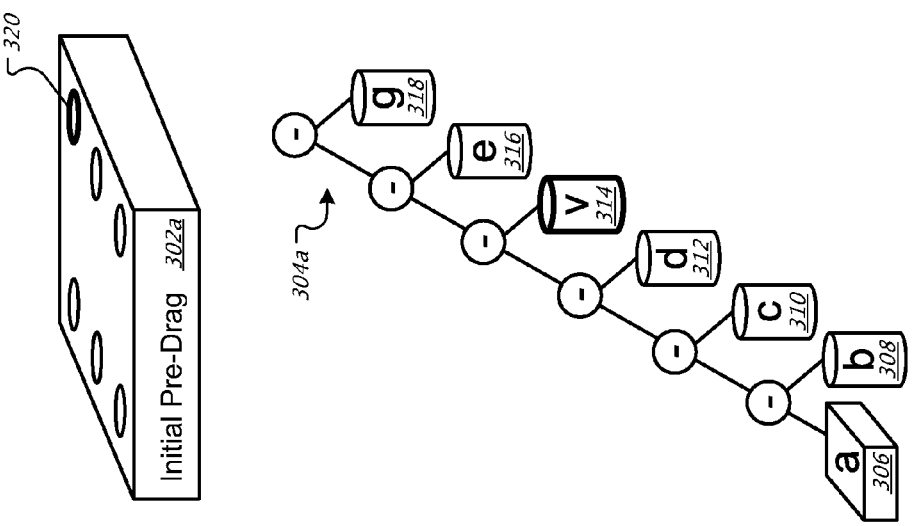
FIG. 3A
FIG. 3B
FIG. 3C

FAST INTERACTIVE OBJECT MANIPULATION

CROSS-REFERENCE TO RELATED APPLICATIONS

This application claims priority to U.S. patent application Ser. No. 60/814,593, entitled FAST INTERACTIVE OBJECT MANIPULATION, to Jiri Kripac, which was filed on Jun. 16, 2006. The disclosure of the above application is incorporated herein by reference in its entirety.

BACKGROUND

In conventional computerized design tools, such as computer aided design (CAD) systems, solid modeling techniques can be employed for designing physical objects such as parts and tools. Solid modeling allows three dimensional (3-D) complex solids to be formed from operations involving simpler objects. For example, a cube object and a cylinder object can be combined by subtracting the cylinder from the cube to create a complex cubic object having a cylindrical hole. Some conventional solid modeling applications use history tree-based functionality (e.g., constructive solid geometry, CSG) for creating complex solids. A history tree embodies the construction history of a complex solid and can be represented as an n-ary tree having operators for inner nodes and simple objects for leaf nodes. A complex cubic object having a cylindrical hole, for instance, could be represented in a history tree having two leaf nodes (i.e., a cube object and a cylinder object), and a parent subtraction operator node.

Along with the construction history of a complex solid, the shape, position and orientation of each object forming the complex solid can be specified in a history tree. A CAD system can use a history tree to create a presentation of a complex solid by evaluating the history tree (e.g., traversing the tree in a bottom-up fashion and applying the operators along the way). Moreover, a CAD system can automatically create and modify history trees to reflect users' manipulations and modifications of visually rendered or "presented" objects, and to update the presentation of the objects. For example, a user can interactively change the position of a visual representation of a handle object to a new location on a visual representation of a cup object (e.g., by dragging the handle using a mouse). This will cause the CAD system that the user is interacting with to update the position and orientation data in the handle leaf node in the history tree of the complex cup solid and update the presentation of the complex cup solid. While the user is in the process of dragging the handle object, the CAD system can provide continuous feedback by updating the visual presentation of the resulting complex cup solid on every mouse move so that the users can observe how the dragging is affecting the resulting complex cup solid.

Evaluating a history tree can introduce latencies in updating presentations of complex solids (e.g., due to the time it can take to evaluate a history tree for a complex solid having many parts). The latency and delay in presenting an updated image can be a distraction for users interactively manipulating complex solids using a CAD system. For example, a complex solid model of an automobile engine may be represented by a history tree containing hundreds of nodes. If a user interactively moves a single part of the engine to a different location, the entire history tree may be required to be reevaluated many times during the move creating a less than desirable user experience.

SUMMARY

In general, one aspect of the subject matter described in this specification can be embodied in a method that includes detecting user manipulation of one or more elements of a presentation of a complex solid represented by a solid history tree. A reduced history tree representation of the complex solid is created. The reduced history tree is repeatedly evaluated to recreate the presentation of the complex solid in response to the user manipulation of the one or more elements. Other embodiments of this aspect include corresponding systems, apparatus, and computer program products.

These and other embodiments can optionally include one or more of the following features. Each of the one or more elements being associated with a leaf node or a subtree in the history tree representation of the complex solid, the history tree representation including a plurality of leaf nodes and a plurality of operator nodes, each leaf node representing a primitive solid and each operator node representing an operation to be performed on one or more child nodes. An operation is a solid Boolean operation union, intersection or difference of solids or a non-Boolean operation edge or a vertex fillet or chamfer. A primitive solid is one of: a box, a tetrahedron, a cylinder, a cone, a sphere, a torus, an extrusion, a revolution, a sweep or a loft. The evaluating is responsive to selection, movement, resizing or otherwise changing of one of more elements. Creating the reduced history tree includes: 1) factoring out constant subtrees; 2) reducing subtrees containing variable nodes; and 3) simplifying union and intersection clusters.

Particular embodiments of the subject matter described in this specification can be implemented to realize one or more of the following advantages. Solid history trees are converted into reduced solid history trees that can be evaluated faster and, as a result, provide a better interactive experience for users manipulating individual parts in complex solids. A complex solid with many parts can then be dynamically rendered as a user keeps interactively repositioning parts in the complex solid. The history tree reduction is done in such a way that when the selected leaf nodes or subtrees (called variable nodes) are being manipulated, the reduced history trees evaluate to the same solids as the original history trees, but are simpler, with a smaller number of leaf nodes and operations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A-C illustrate a solid history tree and pre-evaluation results associated with the solid history tree.

Like reference symbols in the various drawings indicate like elements.

DETAILED DESCRIPTION

A solid history tree is used to represent a construction history of a complex solid. The construction history identifies the objects used to "construct" the complex solid, the operations used during construction, and the order in which the construction occurs. The construction of the complex solid involves a composition of one or more objects called "primitive" solids. A primitive solid can represent a simple 3-D geometric entity, such as a box, tetrahedron, sphere, cone, cylinder or torus, or a more complex shape such as an extrusion, revolution, sweep or loft. Each primitive solid can include predetermined definition data, such as type, size, shape, position and orientation.

Figure 1B:
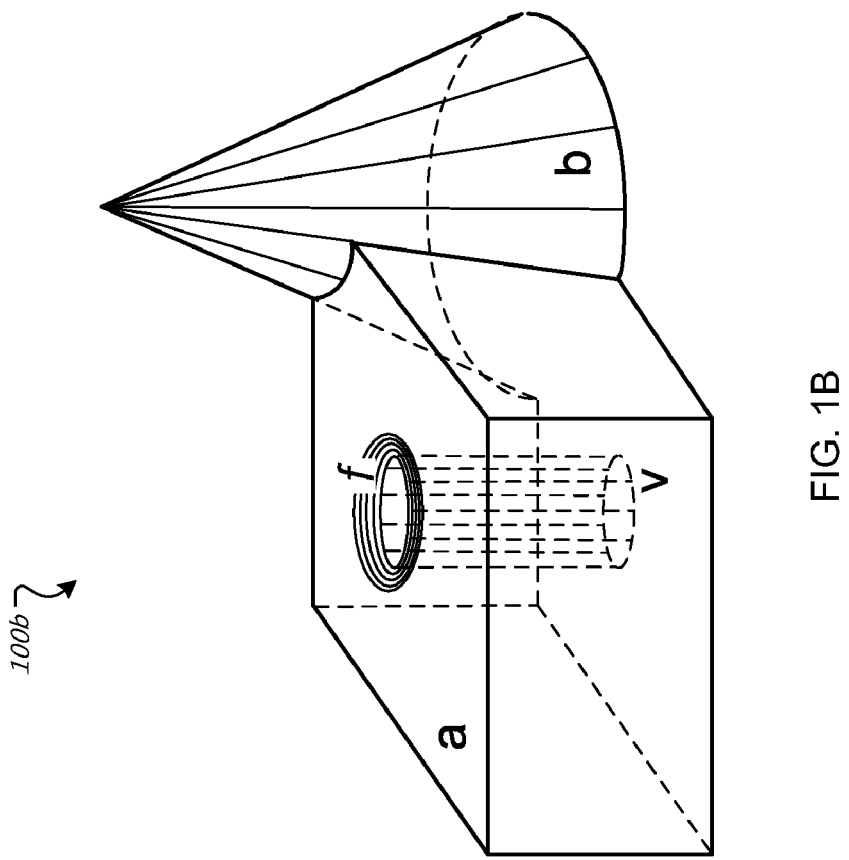
FIGS. 1A-B illustrate a solid history tree representation of an associated complex solid, respectively.
Figure 1A:
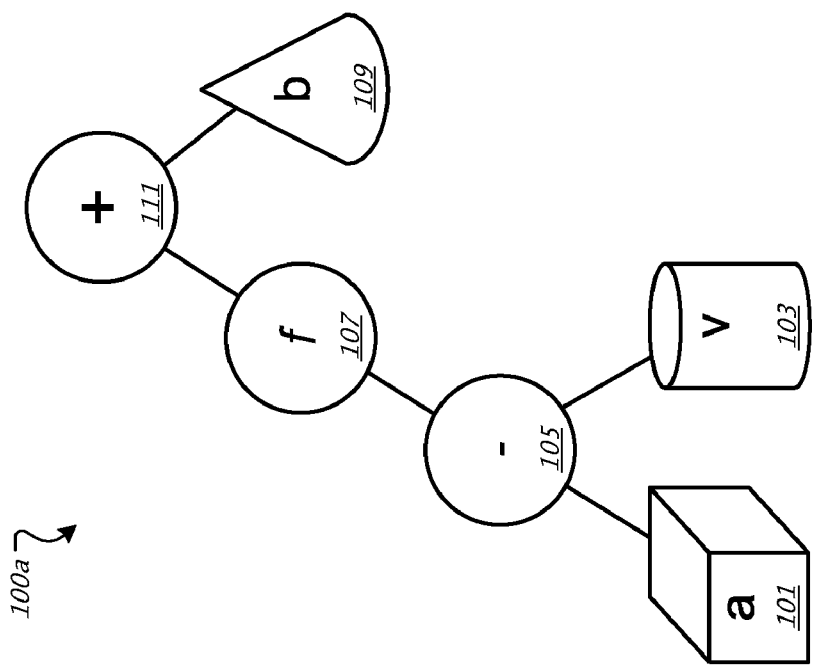

FIG. 1A illustrates a solid history tree representation 100a of complex solid 100b shown in FIG. 1B. A history tree includes one or more nodes of various kinds. Primitive solid nodes (or "leaf" nodes as they are referred to herein) specify a primitive solid. Operator nodes specify an operation on the immediate children of each given operator node. Operations can include, but are not limited to, Boolean operations such as union, intersection and difference of solids, and non Boolean operations such as edge fillets, vertex fillets, and chamfers. An operator node having only one immediate child specifies a "unary" operation; an operator node having two immediate children specifies a "binary" operation, and so on. A history tree representation of a complex solid can be evaluated in a bottom-up fashion to create a presentation of the complex solid.

For example, the tree 100a includes leaf nodes 101, 103 and 109 and operator nodes 105, 107 and 111. As indicated by their shapes, leaf nodes 101, 103 and 109 represent, respectively, a rectangular prism, cylinder and cone portions used to construct complex solid 100b in FIG. 1B. The operator nodes 105, 107 and 111 represent a binary operation for difference of solids, a non Boolean unary fillet operation f, and binary operation for union of solids, respectively. The difference operation 105 calculates the difference between primitive solids represented by leaf nodes 101 and 103, while the unary fillet operation 107 operates on the result of the difference operation 105 to create a bevel on the edge. Likewise, the union operator 111 calculates the union of the result of the unary operator 107 and the leaf node 109. Intermediate versions of the complex solid 100b exist while the history tree 100a is being evaluated.

In one implementation, the first step in evaluating the tree 100a involves subtraction of cylinder "v" from rectangular prism "a", as indicated in FIG. 1B which shows box "a" with cylindrical hole "v" cut through it. Operator node 107 is next evaluated which creates a fillet "f" on the circular edge of the cylindrical hole "v". Finally, operator node 111 is evaluated to combine the intermediate version of the complex solid, represented by operator node 107, with the primitive solid cone "b". The result of evaluating operator node 111 is the complex solid 100b.

Figure 2A:
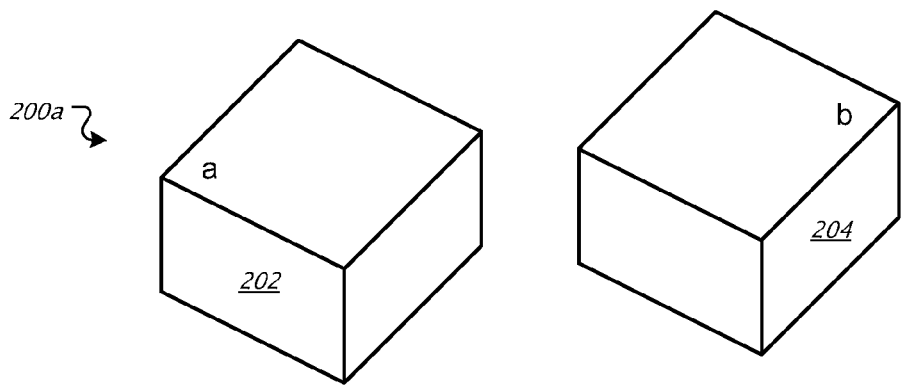
FIGS. 2A-D illustrate examples of operations that can be performed on solids.
Figure 2B:
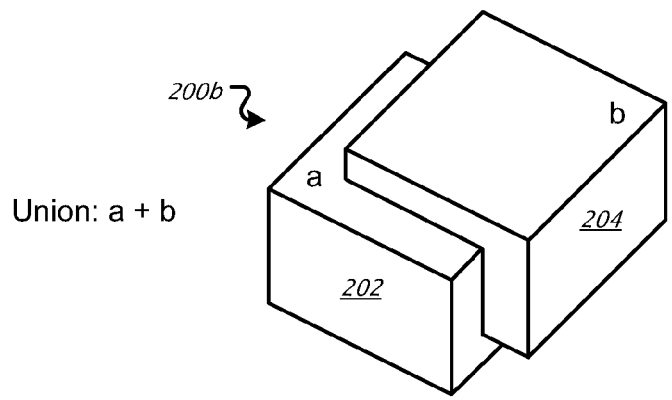

FIGS. 2A-D illustrate Boolean operations that can be performed on solids. For example, in FIG. 2A, consider the "a" cube 202 and a "b" cube 204. The two cubes can overlap to some degree based on their relative or absolute positions, occupying a common space, as shown in FIG. 2B, thus representing a union of the cubes 202 and 204. An algebraic expression such as "a+b" can represent the union of cubes "a" and "b". This union is similar to the union shown in FIG. 1B between cone "b" and the rest of the complex solid.

Figure 2C:
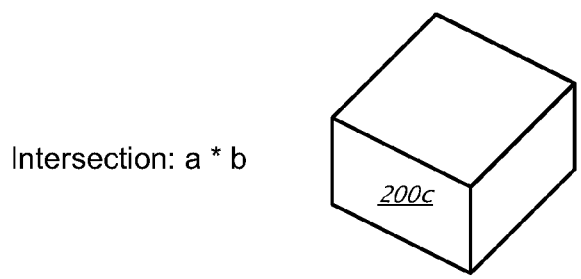

FIG. 2C illustrates another operation that can be performed using the same cubes 202 and 204. Here, the operation is an intersection operation, thus the resulting cube 200c represents the space in common between cubes 202 and 204 as shown in FIG. 2B. An algebraic expression such as "a*b" can represent the intersection of cubes "a" and "b".

Figure 2D:
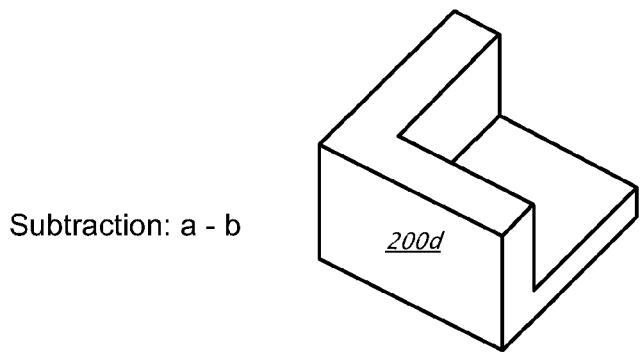

FIG. 2D illustrates the result of a subtraction operation using the same cubes' positions as shown in FIG. 2B. What gets "subtracted" here using three-dimensional solids is actually the intersection between the two solids. Thus, the subtraction operation removes from original "a" cube 202 that part of the cube the intersects with the "b" cube. An algebraic expression such as "a−b" can represent the subtraction of cube "b" from cube "a". By comparison, referring to FIG. 1B, the cylinder "v" is subtracted from the rectangular prism "a", leaving a hole.

FIGS. 3A-C illustrate a solid history tree and pre-evaluation results produced using methods described herein associated with the solid history tree. In FIG. 3A, solid 302a represents the initial version of a rectangular solid through which six holes are cut. For example, the solid 302a represents the current state of a complex solid presented on a display device, such as by a CAD system being used by an engineer, before one of the holes is dragged to a new position. The solid 302a can be represented by a solid history tree such as tree 304a. In particular, tree 304a includes a leaf node "a" 306, representing an initial un-cut rectangular solid, and six operator nodes each representing a subtraction of one cylindrical leaf node "b" 308, "c" 310, "d" 312, "v" 314, "e" 316 and "g" 318, thus cutting holes in the solid. Leaf node 314, referred to as a variable node, represents the element (e.g., hole 320) that the user is manipulating or about to manipulate. Constant leaf nodes represent leaf nodes in a solid history tree that stay constant during user manipulation of the variable node.

For example, the user can interactively move the hole 320 to a new location within the solid 302a. When the movement of an object corresponding to a variable node is first detected (e.g., by a CAD system or other application), the solid history tree can be parsed and pre-evaluated in order to improve the efficiency of subsequent tree evaluations as the object is moved by the user. Pre-evaluation as used herein refers to reduction of a solid history tree in response to a prompt, such as the initial selection of a complex solid feature, movement or resizing of a complex solid feature, or any input prior to any particular action by a user. Thus, in one implementation, before the moving of the hole 320 starts (e.g., concomitantly with selection of the hole 320), the solid history tree 304a is pre-evaluated, producing a reduced tree 304c. Then, during moving of the hole 320, the reduced solid history tree 304c is repeatedly evaluated. Because the reduced solid history tree 304c is much simpler than the original solid history tree 304a, its evaluation can be performed faster so that changes to the complex solid as the hole 320 is moved can be presented in real time, for example.

The tree 304a can be expressed as an algebraic expression which captures the complete history of the tree's construction. In this case, tree 304a can be written as:

$$\text{Tree}=((((((a-b)-c)-d)-v)-e)-g); \quad (1)$$

where parentheses are used to indicate the order of the operations.

In FIG. 3B, solid 302b represents a "factored out" solid, or basically the portion of solid 302a that remains static, or un-moved, during movement of hole 320. The corresponding history tree 304b is thus the "factored out" tree representing solid 302b. In this case tree 304b is similar to tree 304a, except primitive solid node "v" 314 has been removed, but in general case the history tree reduction and factoring out constant subtrees is a more complex process. The factored out tree 304b can also be expressed as an algebraic expression:

$$s=(((((a-b)-c)-d)-e)-g); \qquad (2)$$

An implementation of algebraic manipulation that performs the solid history tree reduction will be described later.

In FIG. 3C, solid 302c shows the hole 320 having been moved, such as via a mouse dragging operation in a CAD system, to a new location within the solid 302c, as indicated by the dashed arrow 322. The reduced solid history tree 304c represents the solid 302c during the movement of the hole 320. The reduced tree 304c includes the variable node 314 representing the hole 320 solid being dragged as well as the factored out tree 304b, drawn as a tree node icon with a rectangular prism having five holes, essentially the ones that are static during the drag operation. During movement of the hole 320, only the reduced tree 304c needs to be evaluated since there is no need to reevaluate the factored out tree 304b. The reduced tree 304c can be written as:

$$304c = s-v; \qquad (3)$$

where the reduced tree represents subtraction of primitive solid "v" 314 from the factored-out subtree "s" 304b. Although the current example includes just seven primitive solids, actual complex solids may include several hundred primitive solids and any combinations of solid Boolean and other operations, thus magnifying the benefits of tree pre-evaluation and simplification.

By way of a further example, another solid history tree contains leaf nodes "a", "b", "c", "d", "e", "g", "h", "i", "j", "k", "v". The variable node "v" is the node being moved by a user. All other leaf nodes remain unchanged for the period of the dragging.

$$\text{Original tree: } (j*(i-(h-((k*((d-(a-(v*c)))-e))+g)))); \qquad (4)$$

Algebraically factored-out constant subtrees:

$$s0=(d-(a-c)); \qquad (5)$$

$$s1=(h-(g+(k*((s0-a)-e)))); \qquad (6)$$

$$s2=(i-(s1-(k*(s0-e)))); \qquad (7)$$

$$s3=(j*(s2-s1)); \qquad (8)$$

$$s4=(j*s2); \qquad (9)$$

$$\text{Reduced tree: } (s3+(s4*v)); \qquad (10)$$

The factored out constant subtrees "s0", "s1", "s2", "s3", "s4" are evaluated only once before the moving of "v" starts. During the moving, only the reduced solid history tree "(s3+(s4*v))" needs to be evaluated on every mouse move, thus reducing the number of Boolean operations that need to be performed from nine to two.

Figure 4:
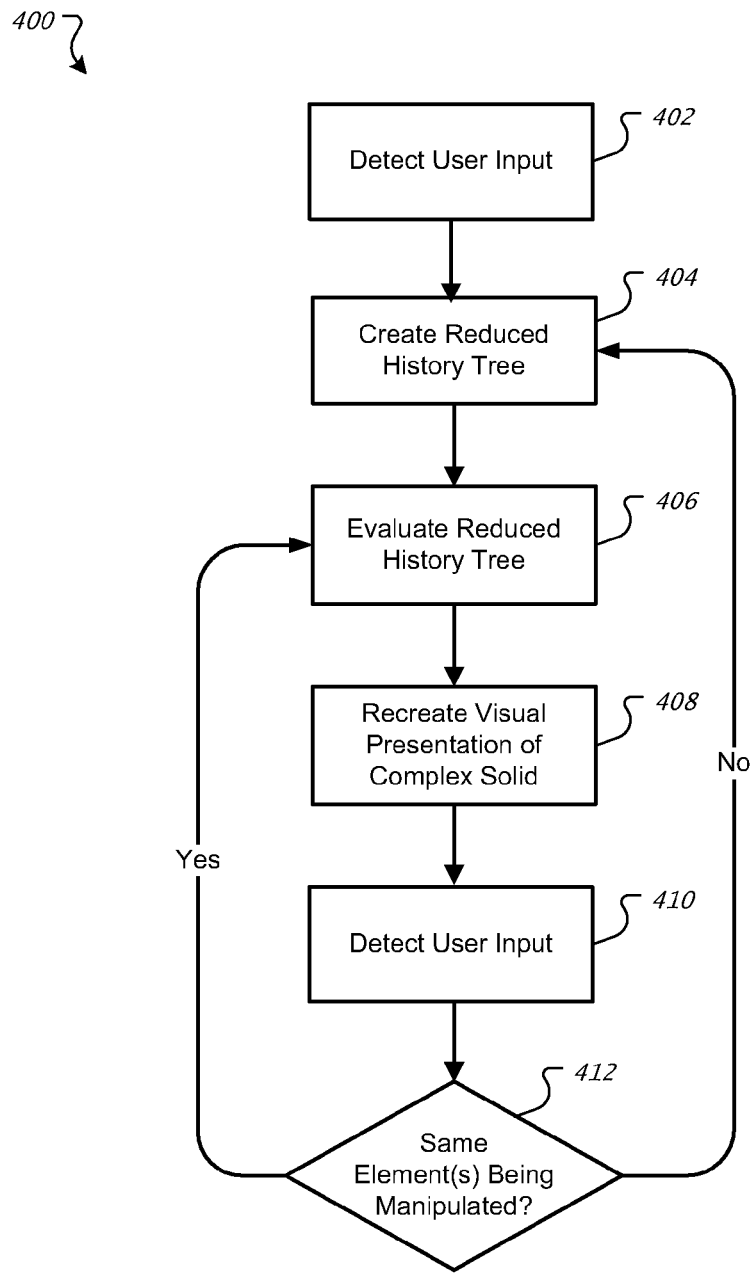
FIG. 4 is a flowchart illustrating a process for pre-evaluating a solid history tree.

FIG. 4 is a flowchart illustrating a technique 400 for pre-evaluating a solid history tree. Pre-evaluation can be triggered by manipulation of (e.g., selection, movement, or resizing) a solid element corresponding to a leaf node or a subtree in a solid history tree. Manipulation of an element of a complex solid is detected (step 402). For instance, a user may have begun to move the element 320 on complex solid 302a (FIG. 3A). A CAD system or other application can receive notification of such from an input device or a process, for example.

In step 404 the history tree is pre-evaluated and a reduced history tree is produced. This can be achieved, for example, by algebraic manipulation algorithms, one possible implementation of which will now be described.

The examples use the following notational conventions: Variable nodes (both leaf nodes and subtrees) are denoted by letter "v", constant leaf nodes are denoted by other letters from the beginning of the alphabet such as "a", "b", "c", factored-out constant subtrees are denoted by letter "s", and non-Boolean nodes (such as an edge filleting operation) are denoted by letter "f". Notice that to the reduction algorithm it is irrelevant if variable nodes are leaf nodes or whole subtrees. If they are subtrees, the algorithm treats them as single indivisible elements and the algorithm stays the same.

The algorithm may perform the history tree reduction in several phases. In the first phase the constant subtrees (e.g., subtrees that do not contain any variable nodes) may be selected and factored out (e.g., creating new subtrees for them and replacing whole subtrees in the original tree with constant leaf nodes that reference these factored-out subtrees). For example:

$$\text{Input tree: } (((f(a+b)*c)-v)+d); \qquad (11)$$

Is rewritten to:

$$\text{Factored-out constant subtree: } s=(f(a+b)*c); \qquad (12)$$

$$\text{Reduced tree: } ((s-v)+d); \qquad (13)$$

In one implementation, the next phase is to convert subtrees containing only a single variable node and no non-Boolean operator nodes to a normalized form, and factor out constant subtrees. The normalized form can be one of the following:

$$a+(v*b); \qquad (14)$$

$$a+(v-b); \qquad (15)$$

$$a+(b-v); \qquad (16)$$

where "v" is the variable node and "a" and "b" are constant leaf nodes. If either "a" or "b" is missing, the normalized form degenerates to v "a+v", "v*b", "v−b", or "b−v". In one implementation, the subtree normalization is performed by traversing the tree in a bottom up fashion (i.e., from leaf nodes to the root), starting from the variable node, processing the Boolean operator nodes, and stopping when the node to process is not a Boolean operator node with one operand being a constant node (the other operand being a normalized subtree) or when the whole tree has been processed.

When processing a Boolean operator node, set operation algebraic rules can be applied to the normalized subtree and to the Boolean node so that the reduced subtree is always maintained in the normalized form. For example, if there is an intersection Boolean operator node whose one argument is a constant leaf node "c" and the other argument is a normalized subtree, such as "(a+(v−b))", the tree is rewritten and constant subtrees factored out to maintain the rewritten tree in the normalized form. For example:

$$\text{Input tree: } (c*(a+(v-b))); \qquad (17)$$

Is rewritten to:

$$\text{Factored-out constant subtrees: } s0=(c*a); \qquad (18)$$

$$s1=(c-b); \qquad (19)$$

$$\text{Reduced normalized tree: } (s0+(v*s1)); \qquad (20)$$

In one implementation, the next phase is to normalize and reduce subtrees containing variable nodes using the same normalization algorithm as above, but in this case "v" standing for a subtree whose root node is either a non-Boolean node or is a Boolean node whose both input arguments are subtrees, instead of one of them being a constant leaf node. For example, if there is a subtraction Boolean node whose first argument is a normalized subtree, such as "(a+((v1+v2)*b))", containing two variable nodes "(v1+v2)", and the second argument is a constant leaf node "c", the tree is rewritten and constant subtrees factored out to maintain the rewritten tree in the normalized form:

Input tree: ((a+((v1+v2)*b))−c); (21)

Is rewritten to:

Factored-out constant subtrees: $s0=(a-c)$; (22)

$s1=(b-c)$; (23)

Reduced normalized tree: (s0+((v1+v2)*s1)); (24)

In one implementation, the next phase may be to simplify clusters of union and intersection Boolean operator nodes that contain more than one constant node by factoring out the union or intersection of these constant nodes. For example:

Input tree: ((v1+a)+(v2+b)) (25)

Is rewritten to:

Factored-out constant subtree: $s=(a+b)$ (26)

Reduced tree: ((v1+v2)+s) (27)

The reduced history tree is then evaluated (step 406). More specifically, the reduced history tree is traversed in a bottom-up fashion while applying the operators along the way. A visual presentation of the complex solid can optionally be created (step 408) from the result of the evaluation of the reduced history tree. For example, referring to FIG. 3C, a CAD system or other application can redraw the complex solid 302c, showing the new location of the element 314 in its new location 320 via path 322.

The step 412 checks whether the user continues manipulating the same element or elements of a complex solid. For instance, a user may keep moving the element 320 on complex solid 302a (FIG. 3A). If this is the case, the process continues at step 406. Since to evaluate the resulting complex solid the CAD system can use the reduced history tree that was created in step 404, the CAD system feedback is faster and potentially can be performed in real time as the user is moving the element. If the user chooses to manipulate a different element or elements, the process continues at step 404.

Figure 5:
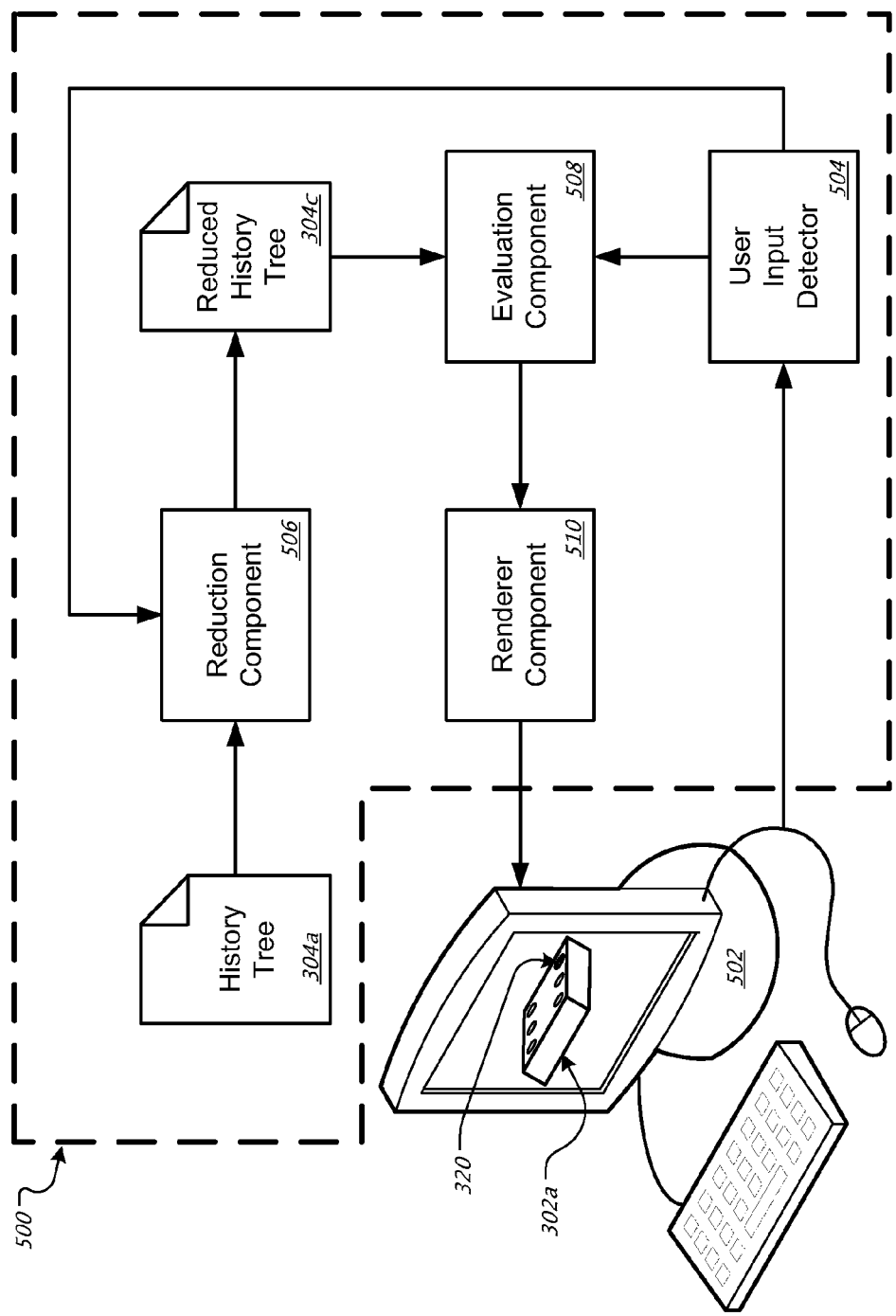
FIG. 5 illustrates a system for pre-evaluating solid history trees as might be implemented in a CAD system or other interactive application.

FIG. 5 illustrates a system 500 for pre-evaluating solid history trees as might be implemented in a CAD system or other interactive application. Although several components are illustrated, there may be fewer or more components in the system 500. Moreover, the components can be distributed on one or more computing devices connected by one or more networks or other suitable communication means.

A user can interact with the system 500 through a computer 502 or other device. For example, the computer 502 can be a computer terminal within a local area network (LAN) or wide area network (WAN). In particular, the user may be utilizing the CAD system to manipulate a complex solid (e.g., 302a). When the user initiates movement of an element (e.g., hole 320) of the complex solid 302a, a user input detector component 504 receives an indication of such from the computer 502 or a process, for example. Upon detection of the movement, a reduction component 506 reduces the solid history tree associated with the complex solid (e.g., history tree 304a) to create a reduced history tree (e.g., 304c) as described above. The reduced history tree 304c includes a pre-evaluated version of the original complex solid history tree 304a. The reduced history tree 304c can then be evaluated one or more times by an evaluation component 508 as required by the rendering component 510 for creating an interactive presentation of the complex solid 302a. For example, the reduced tree 304c can be evaluated several times in order to allow presentation of the complex solid 302a to keep up with user movement of the element. While the system 500 presents the complex solid 302a, the system 500 can also update the corresponding history tree 304a to reflect movement of the element and to thus maintain an up-to-date representation of the complex solid 302a.

Figure 6:
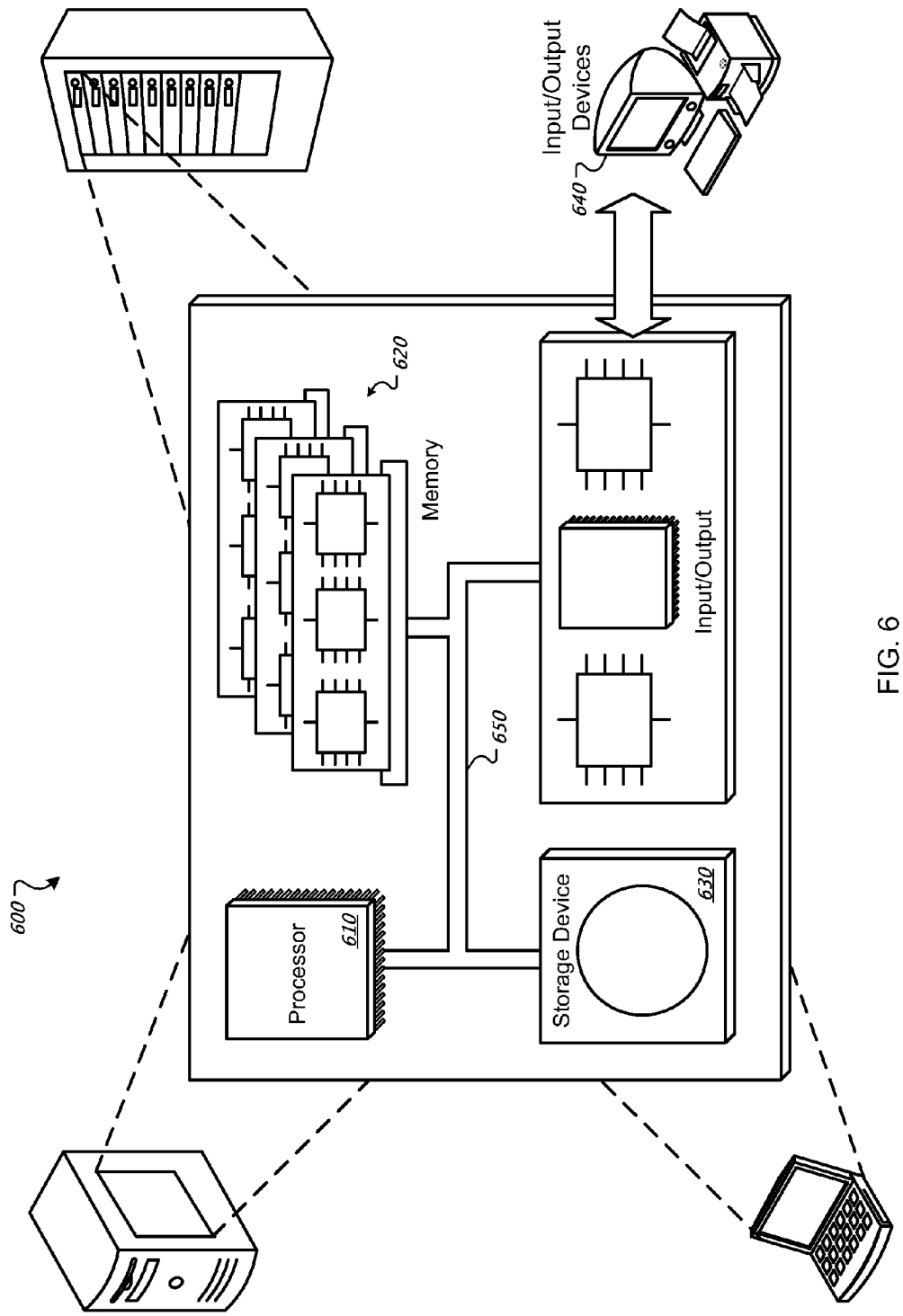
FIG. 6 is a schematic diagram of a generic computer system.

FIG. 6 is a schematic diagram of a generic computer system 600. The system 600 can be used for practicing operations described in association with the technique 400. The system 600 can include a processor 610, a memory 620, a storage device 630, and an input/output device 640. Each of the components 610, 620, 630, and 640 are interconnected using a system bus 650. The processor 610 is capable of processing instructions for execution within the system 600. Such executed instructions can implement one or more components of system 500, for example. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non volatile that stores information within the system 600. The memory 620 could store data structures representing history trees and reduced history trees for complex solids, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

The input/output device 640 can provide input/output operations for a CAD system. The CAD system can be, for example, AutoCad®, Autodesk Architectural Desktop® or Autodesk Building Systems®, available from Autodesk, Inc., of San Rafael, Calif., or another CAD application or other software application. The CAD system can include computer software components that manage solid history trees. Examples of such software components include the user input detector 504, the reduction component 506, the evaluation component 508, and the renderer component 510. Such software components 504, 506, 508 and 510 can be persisted in storage device 630, memory 620 or can be obtained over a network connection, to name a few examples.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Various modifications may be made to the disclosed implementations and still be within the scope of the following claims.

What is claimed is:

1. A computer-implemented method, comprising:
    detecting initiation of user movement of an element of a complex solid that is represented by a solid history tree of multiple elements;
    in response to the detecting initiation of user movement of the element, creating a reduced history tree representation of the complex solid by factoring out from the solid history tree of multiple elements a constant subtree of elements that remain un-moved during user movement of the element and replacing the factored-out constant subtree with a constant leaf node that represents the factored-out constant subtree, the constant subtree factored out before the user movement of the one or more elements;
    receiving user input moving the element of the complex solid; and
    presenting the complex solid for display as the element of the complex solid is moved by the user by repeatedly evaluating the reduced history tree including the constant leaf node during the movement of the element.

2. The computer-implemented method of claim 1, where:
    the element is associated with a leaf node or a subtree in the history tree representation of the complex solid, the history tree representation including a plurality of leaf nodes and a plurality of operator nodes, each leaf node representing a primitive solid and each operator node representing an operation to be performed on one or more child nodes.

3. The computer-implemented method of claim 2, where:
    an operation is a solid Boolean operation union, intersection or difference of solids or a non-Boolean operation edge or a vertex fillet or chamfer.

4. The computer-implemented method of claim 2, where:
    a primitive solid is one of: a box, a tetrahedron, a cylinder, a cone, a sphere, a torus, an extrusion, a revolution, a sweep or a loft.

5. The computer-implemented method of claim 1, where the constant subtrees do not represent the moved elements.

6. The computer-implemented method of claim 1, where creating the reduced history tree includes:
    reducing subtrees containing variable nodes.

7. The computer-implemented method of claim 1, where creating the reduced history tree includes:
    simplifying union and intersection clusters.

8. A computer program product, encoded on a computer-readable storage device, the computer program product including instructions operable to cause one or more data processing apparatus to perform operations comprising:
    detecting initiation of user movement of an element of a complex solid that is represented by a solid history tree of multiple elements;
    in response to the detecting initiation of user movement of the element, creating a reduced history tree representation of the complex solid by factoring out from the solid history tree of multiple elements a constant subtree of elements that remain un-moved during user movement of the element and replacing the factored-out constant subtree with a constant leaf node that represents the factored-out constant subtree, the constant subtree factored out before the user movement of the one or more elements;
    receiving user input moving the element of the complex solid; and
    presenting the complex solid for display as the element of the complex solid is moved by the user by repeatedly evaluating the reduced history tree including the constant leaf node during the movement of the element.

9. The program product of claim 8, where:
    the element is associated with a leaf node or a subtree in the history tree representation of the complex solid, the history tree representation including a plurality of leaf nodes and a plurality of operator nodes, each leaf node representing a primitive solid and each operator node representing an operation to be performed on one or more child nodes.

10. The program product of claim 9, where:

an operation is a solid Boolean operation union, intersection or difference of solids or a non-Boolean operation edge or a vertex fillet or chamfer.

11. The program product of claim 9, where:

a primitive solid is one of: a box, a tetrahedron, a cylinder, a cone, a sphere, a torus, an extrusion, a revolution, a sweep or a loft.

12. The program product of claim 8, where the constant subtrees do not represent the moved elements.

13. The program product of claim 8, where creating the reduced history tree includes:

reducing subtrees containing variable nodes.

14. The program product of claim 8, where creating the reduced history tree includes:

simplifying union and intersection clusters.

15. A system comprising:

a computer-readable storage device including instructions; and one or processors operable to execute the instructions and perform operations, the operations comprising;

detecting initiation of user movement of an element of a complex solid that is represented by a solid history tree of multiple elements;

in response to the detecting initiation of user movement of the element, creating a reduced history tree representation of the complex solid by factoring out from the solid history tree of multiple elements a constant subtree of elements that remain un-moved during user movement of the element and replacing the factored-out constant subtree with a constant leaf node that represents the factored-out constant subtree, the constant subtree factored out before the user movement of the one or more elements;

receiving user input moving the element of the complex solid; and presenting the complex solid for display as the element of the complex solid is moved by the user by repeatedly evaluating the reduced history tree including the constant leaf node during the movement of the element.

16. The system of claim 15, where the constant subtrees do not represent the moved elements.

17. The system of claim 15, where creating the reduced history tree includes:

reducing subtrees containing variable nodes.

18. The system of claim 15, where creating the reduced history tree includes:

simplifying union and intersection clusters.

19. The method of claim 1, wherein the repeated evaluations are performed in real time during the user manipulation.

20. The system of claim 15, where:

the element is associated with a leaf node or a subtree in the history tree representation of the complex solid, the history tree representation including a plurality of leaf nodes and a plurality of operator nodes, each leaf node representing a primitive solid and each operator node representing an operation to be performed on one or more child nodes.

21. The system of claim 20, where:

a primitive solid is one of: a box, a tetrahedron, a cylinder, a cone, a sphere, a torus, an extrusion, a revolution, a sweep or a loft.

* * * * *

UNITED STATES PATENT AND TRADEMARK OFFICE
CERTIFICATE OF CORRECTION

| | |
|---|---|
| PATENT NO. | : 7,755,621 B2 |
| APPLICATION NO. | : 11/468151 |
| DATED | : July 13, 2010 |
| INVENTOR(S) | : Jiri Kripac |

It is certified that error appears in the above-identified patent and that said Letters Patent is hereby corrected as shown below:

Column 11, line 24, in Claim 15 delete "one or processors" and insert -- one or more processors --, therefore.

Signed and Sealed this

Nineteenth Day of October, 2010

David J. Kappos
*Director of the United States Patent and Trademark Office*